(12) United States Patent
Lee et al.

(10) Patent No.: US 7,186,345 B2
(45) Date of Patent: Mar. 6, 2007

(54) SYSTEMS FOR WATER PURIFICATION THROUGH SUPERCRITICAL OXIDATION

(75) Inventors: Sunggyu Lee, Columbia, MO (US); Asdrubal Garcia-Ortiz, Chesterfield, MO (US); John Wootton, St. Louis, MO (US)

(73) Assignee: Engineered Support Systems, Inc., St. Louis, MO (US)

( * ) Notice: Subject to any disclaimer, the term of this patent is extended or adjusted under 35 U.S.C. 154(b) by 251 days.

(21) Appl. No.: 10/840,716

(22) Filed: May 6, 2004

(65) Prior Publication Data

US 2005/0006317 A1    Jan. 13, 2005

Related U.S. Application Data (60) Provisional application No. 60/477,840, filed on Jun. 12, 2003, provisional application No. 60/468,339, filed on May 6, 2003.

(51) Int. Cl.
    *C02F 1/72*    (2006.01)
(52) U.S. Cl. ........................ 210/761; 210/765
(58) Field of Classification Search ................ 210/761
    See application file for complete search history.

(56) References Cited

U.S. PATENT DOCUMENTS

| | | | |
|---|---|---|---|
| 4,338,199 A | 7/1982 | Modell | 210/721 |
| 4,543,190 A | 9/1985 | Modell | 210/721 |
| 4,861,497 A * | 8/1989 | Welch et al. | 210/759 |
| 5,080,692 A | 1/1992 | Lee et al. | 44/624 |
| 5,106,513 A | 4/1992 | Hong | 210/759 |
| 5,386,055 A | 1/1995 | Lee et al. | 562/512.2 |
| 5,492,634 A * | 2/1996 | Hong et al. | 210/761 |
| 5,516,952 A | 5/1996 | Lee et al. | 585/241 |
| 5,615,627 A * | 4/1997 | Marr, Jr. | 110/346 |
| 5,663,237 A | 9/1997 | Lee et al. | 525/285 |
| 5,723,045 A * | 3/1998 | Daman | 210/175 |
| 6,051,145 A | 4/2000 | Griffith et al. | 210/761 |
| 6,080,309 A * | 6/2000 | Reid et al. | 210/177 |
| 6,103,129 A | 8/2000 | Bond et al. | 210/721 |
| 6,264,844 B1 | 7/2001 | Modell et al. | 210/696 |
| 6,332,986 B1 | 12/2001 | Johnson et al. | 210/758 |

(Continued)

FOREIGN PATENT DOCUMENTS

DE    102 17 165 A1    2/2004

(Continued)

OTHER PUBLICATIONS

Shaw, R.W., "Supercritical Water Oxidation of Toxic Military Materials: Current Status".

(Continued)

*Primary Examiner*—Peter A. Hruskoci
(74) *Attorney, Agent, or Firm*—Lewis, Rice & Fingersh, L.C.

(57) ABSTRACT

Supercritical water (SCW) systems and methods using the properties of supercritical water to allow a raw water stream including water and a contaminant to be purified. A supercritical water oxidation (SCWO), water purifier may generally include water and oxidizer (such as oxygen in air) pumping and mixing apparatus, a supercritical water reactor, and a system for separating the resultant purified water from other relatively harmless outputs of the supercritical water reactor.

18 Claims, 8 Drawing Sheets

U.S. PATENT DOCUMENTS

| | | | | |
|---|---|---|---|---|
| 6,340,722 | B1 | 1/2002 | Lee et al. | 524/428 |
| 6,511,601 | B2 | 1/2003 | McMurtrey et al. | 210/634 |
| 6,519,926 | B2 | 2/2003 | Hazlebeck | 60/39.12 |
| 6,585,890 | B2 | 7/2003 | Li et al. | 210/175 |
| 6,709,601 | B2 | 3/2004 | Wofford, III et al. | 210/749 |
| 6,709,602 | B2 | 3/2004 | Spritzer et al. | 210/750 |
| 2002/0113024 | A1 | 8/2002 | Pilz et al. | 210/761 |

FOREIGN PATENT DOCUMENTS

| | | | |
|---|---|---|---|
| JP | 02003033746 A | * | 2/2003 |

OTHER PUBLICATIONS

Shaw, R.W. and Dahman, N., "Destructionof Toxic Organic Material Using Supercritical Water Oxidation: Current State of the Technology", in Supercrital Fluids-Fundamentals and Pllications, Kiran, E. et al., (Eds.), pp. 425-437, Kluwer Academic, 2000.

Gidner, A. and Stenmark, L., "Supercritical Water Oxidation of Sewage Sludge-State of the Art".

Abeln, J. and Kluth, M., "Waste Oxidation in Supercritical Water Using a Transpiring Wall Reactor".

Sprtitzer, M.H., Elliot, J.P. and Hazlebeck, D.A., "Advanced Hydrothermal Oxidation of Shipboard Wastes".

Minett, S. and Fenwick, K., "Supercritical Water Oxidation for Organic Waste Disposal", Specialty Chemicals, Apr. 2001.

"Supercritical Water Oxidation State-Of-The-Art Enviroinmental Technology", General Atomics and Affiliated Companies.

Supercritical Fluids-Molecular Interactions, Physical Properties, and New Applications, Y. Arai, T. Sako and Y. Takebayashi, eds., Springer Series in Material Processing, Springer-Verlag berlin Heidelberg, 2002, Chapter 1, 4, 5, and 6.

Supercritical Fluids-Fundamental and Applications, E. Kiran, P.G. Debenedetti and C.J. Peters, eds., Kluwer Academic Publishers, Dordrecht, The Netherlands, 2000. Chapters 1, 13, 14, 17, 19, 20 and 22.

Chematur Engineering, "Aqua Critox," www.chematur.se/sok/group/SCFT/scwo/scwo_aquacritox.htm.

Chematur Engineering, "Successful Test of the Aqua Reci Process Finalized," www.chematur.se/sok/news/nov26_02_eng.htm.

Ali, Mir Nadeem, et al., "Supercritical Water Oxidation of the Sewage Sludge from Ryaverket Wastewater Treatment Plant," www.wscsd.org/ejournal/article.php3?id_article=159.

Stendahl, K., et al., "Phosphate Recovery from Sewage Sludge in Combination with Supercritical Water Oxidation," Water Science and Technology, vol. 48, No. 1, pp. 185-191, 2003.

Gloyna, E., et al, "Supercritical Water Oxidation: An Innovated Wastewater Treatment Concept," www.dept.lamar.ed/grhsrc/htdocs/newsletters/news98/oxi.htm.

* cited by examiner

SYSTEMS FOR WATER PURIFICATION THROUGH SUPERCRITICAL OXIDATION

CROSS REFERENCE TO RELATED APPLICATION(S)

This application claims priority to U.S. Provisional Patent Applications Ser. No. 60/468,339 filed May 6, 2003 and 60/477,840 filed Jun. 12, 2003. The entire disclosure of both documents is herein incorporated by reference.

BACKGROUND OF THE INVENTION

1. Field of the Invention

This disclosure relates to the field of water purification and converting wastewater into potable water. In particular, to the use of supercritical water oxidation to purify water to a potable state.

2. Description of the Related Art

The provision of clean drinking water is a problem the world over. In industrialized areas, the provision of clean drinking water and disposal of wastewater is generally done in two steps and often by two completely different agencies.

Water from the environment is generally not accepted as potable. Environmental water is generally purified and cleaned prior to being provided to users with the water being filtered generally multiple times and then treated with chemicals or other processes to destroy microorganisms and remove harmful chemicals. The water may also need to be desalinated to remove salt. This is performed by various water purification plants.

Pollution is introduced into potable water through industrial processes, human wastes, and many other activities where water comes into contact with particular pollutants. In most cases, it is necessary to remove some if not all of these pollutants before the water is returned to the environment. This is performed by various wastewater treatment and sewage treatment plants.

Overall this process essentially results in a near perfect pattern of water recycling. Water is taken from the environment and cleaned for use by humans making it potable in most cases. The water is used and then cleaned for return to the environment where it is "stored" until needed again.

While this type of dual process makes a lot of sense for a large industrialized city and the world as a whole, in many situations the large scale treatment of water is simply not required or may not be economically feasible. This is particularly true in small towns or in temporary residences such as refugee camps, military base camps, or onboard ships.

In these situations, the amount of water available is often a limited amount based on the population and/or location and the available environmental water is regularly insufficient to handle the need. Further, because infrastructure may not be available or may not be functioning, systems are often required to provide emergency relief. Because of this, returning the used water to the environment and gathering environmental water is often not possible and wastewater may be treated and filtered and returned to active use in a relatively short period of time.

While these uses of water can be considered small in terms of quantity, they can still require tens of thousands of gallons of water a day to be consumed and tens of thousands of gallons of wastewater to be generated. Current water purification systems generally require huge amounts of power to run purification systems, pumps, and filters to recycle wastewater with a quick turnaround. Further, many of the most effective purification strategies require one thing that these types of self contained environments do not have, which is time for the wastewater to be treated.

To deal with this problem, most so-called self-contained systems are not self-contained at all but rely on a steady influx of environmental water (and a steady outflow of wastewater) or have a large supply of water available compared to the daily usage demands to allow for the passage of time while water is being purified.

One place where the need for water purification is very necessary is the military. Naval vessels often must be self reliant at sea and support the needs of their crew. Further, ground based units will generally need a base camp or other location to meet the needs of the soldiers which can be positioned far from any infrastructure. Further, such infrastructure, even if it does exist, is likely to be non-functional because of the military activity and contamination concerns can be heightened during military actions as poisoning or fouling of water supplies can be used to slow or halt a military forces' progress. Water sources generally consist of local streams, ponds, and/or brackish water wells. Water purification is also necessary for treating the output water of many human activities. Kitchens, showers, latrines, and laundry services all need potable water to function without danger. All these devices also produce contaminated wastewater that needs to be dealt with to reduce the spread of disease and other dangers.

Currently, the logistics requirements for water in the military are immense. Even when water sources are available to troops in the field, the power demands to pump and purify water and to filter waste and dispose of the contaminants can be enormous. Most existing systems also rely on separate logistics to dispose of solid waste generated by the filtering process. Most of these systems also rely on the burning of diesel or other fossil fuels to generate power which is also polluting and can further increase logistics trails and cost to purify water. Fuel consumption associated with the logistics trail is the predominant cost factor of the overall process, and fuel cost is dictated by the distance traveled to deliver it. For these reasons the ability to process water locally, whether from a water source or wastewater, is a highly sought after operational capability.

The most recent and considered best water purification systems treat water by screening, coagulation, micro-filtration, reverse osmosis, and chlorine disinfection. Additionally, ion exchange and activated carbon may used when the source of water is known to be contaminated with biochemical threats. While reverse osmosis is the technology of choice to process "raw" water, the process still has major limitations in the presence of certain contaminants like oil, fuel, silt, algae and viruses, and depending on the contamination, the "raw" water may not be able to be processed to a potable level. Furthermore, reverse osmosis only recovers a portion of the processed water for potable use. The remainder comes out as a brine solution which requires proper disposal. The use of granulated carbon in addition to reverse osmosis can be used to improve potability, but demands that the carbon column be maintained at very strict time intervals in order to ensure that safe potable water levels are met. The addition of calcium hypochlorite to the reverse osmosis treatment may also improve the water product, but certain biological agents are known to be chlorine resistant.

This entire purification system is costly, requires significant supervision, and is still not a particularly high efficiency process. Because of this, water purification is often a costly, cumbersome, and expensive process.

SUMMARY

Because of these and other problems in the art, described herein are systems and methods for using supercritical water oxidation to purify water to a potable state. These systems and methods are generally designed to be portable and to allow for relatively high speed purifying of water without the need to have large influxes of environmental water, disposal of large amounts of wastewater or wastewater byproducts, and decreased power requirements.

There is described herein, in an embodiment, a method for generating potable water comprising: having a supercritical water reactor (SCWR); providing the SCWR with raw water; the raw water comprising water and at least one organic contaminant; placing the raw water in a supercritical state thereby dissolving the contaminant into the water; mixing oxygen with the raw water; allowing the oxygen to completely oxidize the contaminant; separating resultant water from other outputs of the oxidation; capturing the resulting water using the resulting water as potable water.

In another embodiment, the raw water includes wastewater such as that from a laundry system, a kitchen system, a shower system, a latrine system, a ships' bilge, or a ships' fuel tank. In an embodiment the raw water may comprise sewage.

In another embodiment, the raw water is from an environmental fresh water source, and environmental salt water source, or an environmental brackish water source.

In another embodiment, air may be mixed with the raw water to provide the oxygen.

In another embodiment the contaminant comprises at least one of a micro organism, or an organic chemical compound. The contaminant may be suspended or dissolved in the water.

In another embodiment the raw water also includes at least one of a salt, a metal, or an inorganic chemical compound.

In still another embodiment, there is described a system for purifying water comprising: raw water comprising water, and at least one contaminant; an oxidizer; means for taking the raw water and oxidizer and increasing pressure and temperature to make the water in the raw water supercritical; the supercriticality and the presence of the oxidizer forming the contaminant into a different material; and means for separating the water from the different material.

In a still further embodiment of the system, the different material is selected from the group containing water, carbon dioxide, and nitrogen. The oxidizer may also be oxygen which may be provided as a part of air.

In yet another embodiment, there is described a system for purifying water comprising: raw water comprising water and at least one contaminant; an oxidizer; and a supercritical water reactor (SCWR); wherein in the SCWR, the water in the raw water is placed in a supercritical state and the contaminant is formed into a different material due to the water being in the supercritical state and the presence of the oxidizer.

BRIEF DESCRIPTION OF THE FIGURES

FIG. 2 Provides a flowchart diagram showing process flow in supercritical water purification (FIG. 2A) and desalination (FIG. 2B).

FIG. 6 Provides for the process flow of water in a laundry system using a distillation water reclamation system (FIG. 6A) and the process flow of water in a similar laundry system utilizing an embodiment of an SCWO purification system (FIG. 6B)

DESCRIPTION OF PREFERRED EMBODIMENT(S)

Disclosed herein, among other things, is a supercritical water oxidation (SCWO) system for converting raw water which may or may not contain any kind of contaminant, whether or not harmful to human beings or whether or not present in sufficient quantities to harm human beings, into potable water. The raw water may be supplied from any source of water. Generally, the source will be at least partially wastewater supplies from prior human use of potable water (e.g. liquid sewage, used shower runoff, used laundry water or similar waters). In an alternative embodiment, the water may be partially or fully from environmentally based water sources for fresh water where potability will generally be undetermined or insufficient (e.g. lakes, rivers, underground wells, rain water or the like). In a still further embodiment environmental based sources of salt water (e.g. seawater) or brackish water, may provide some or all of the raw water. This water may be potable but for the salt content or may be additionally contaminated. In all cases, it is presumed that the raw water will be desired to be purified or otherwise have various materials removed from it prior to it being provided as potable water, even if such purification is not strictly necessary to make the water potable to humans.

The term "raw water" as used herein is intended to be a general term relating to water where purification is desired. This will generally be because the water has been previously used or is taken from the environment and is not viewed as clean or needs to be desalinated. For clarity, the raw water is desired to be processed, even if such cleaning, purifying, or desalination is unnecessary. Raw water generally will comprise of water mixed or in solution with any number of contaminants. A contaminant is essentially any material mixed with or in solution with the water and specifically includes, but is not limited to, pollutants, microorganisms, metals, salts, biologicals, chemicals, or other materials. Most contaminants of interest will be organic contaminants but that is not strictly required, and either or both organic and inorganic contaminants can be included. The contaminant may be suspended or dissolved in the water, or may simply be carried by the water. Generally, it will be presumed that the materials to be removed are either biological or chemical in nature such as those which would occur in naturally occurring water sources, water sources purposefully or accidentally fouled by man, or in wastewater generated from prior human use such as cooking, cleaning, laundering, or latrine services. It should also be noted that the use of the term "purifying" as used herein in conjunction with water can mean removing any contaminant in the water including salt (desalination) to provide water in a purer form.

Figure 1:
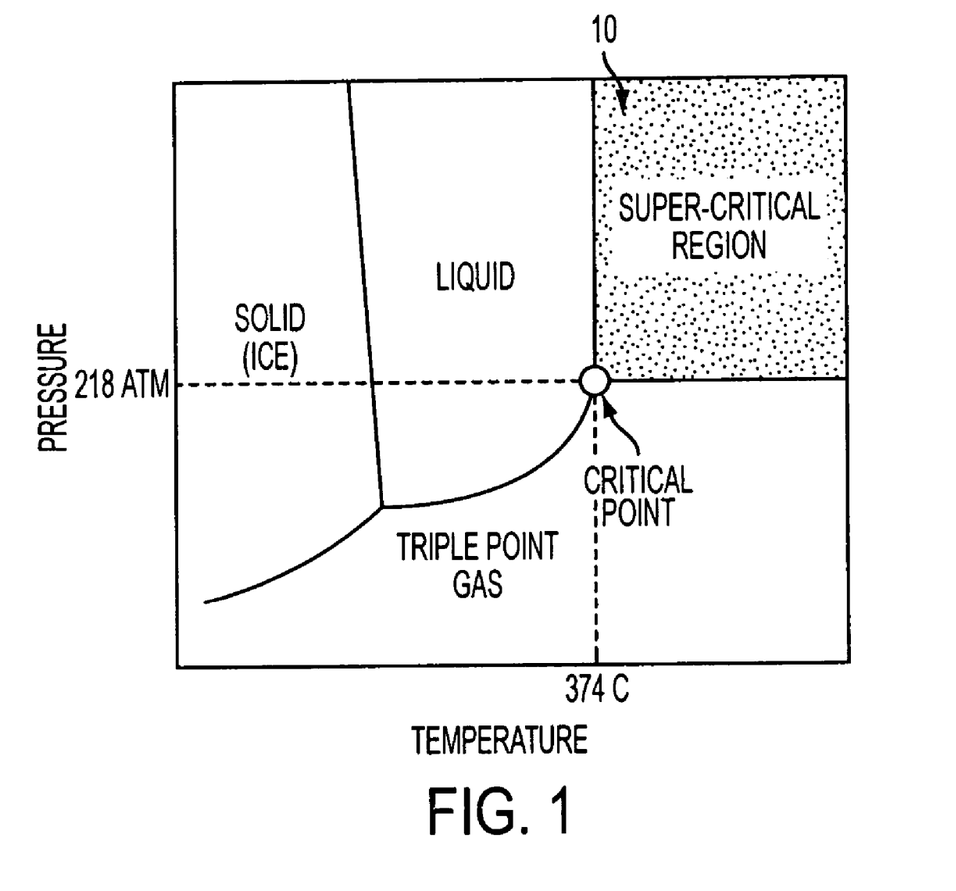
FIG. 1 Provides a graph showing the conditions of supercritical water.
Figure 2A:
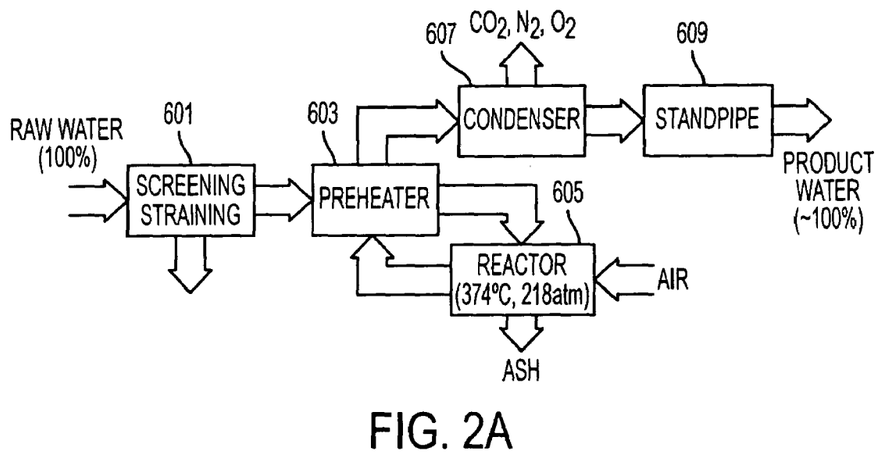
Figure 2B:
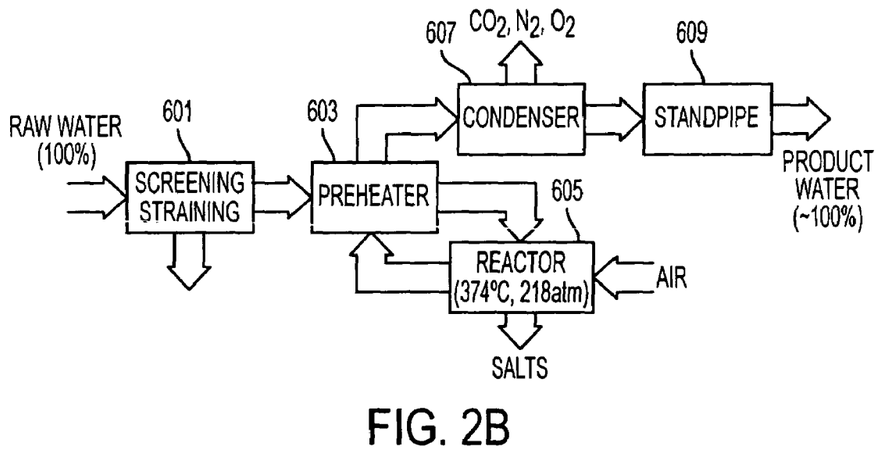

FIG. 1 generally shows the region (10) where water exists in its supercritical state. In this discussion, supercritical water will generally be raw water which has been placed in the supercritical state to purify it. It should be clear that supercritical water may include contaminants in the water which may or may not be in a supercritical state. FIG. 2 provides a general flowchart of the SCWO purification process in both a purification and a desalination arrangement. As can be seen, both arrangements are identical. The SCWO reaction water provides for excellent solubility of organic materials and very low solubility of inorganic materials. Salt is generally treated just like any other material to be removed.

Generally, as shown in the walkthrough of FIG. 2, the raw water will first be strained in step (601) to eliminate relatively large solid particles such as flotsam, flora, and fauna suspended in or carried by the water. In step (603) the input water will be pressurized and heated in preparation for placement in the supercritical water reactor (SCWR) (605). In the depicted embodiment, this pressurization and heating is performed at least partially by work and heat transfer from the output effluent stream of the SCWR reaction step (605). In the SCWR reaction step (605) pressurized air is combined with the water. Any organic matter present in the water is fully oxidized in the reactor, while ash or salts (depending on the contaminant(s) present) will be separated from the input water purifying the resultant (output) water. Thermal energy may be added to the reactor to maintain its temperature inside the supercritical water region (10). The output effluent water will then pass into a work and heat exchanger (603) where energy is transferred from the reactor output to the reactor input. In step (607), the output effluent water is condensed to allow for water capture while other gases present in the stream may be vented or otherwise removed. In step (609) the output water is provided as needed either to distribution or storage systems.

Figure 3:
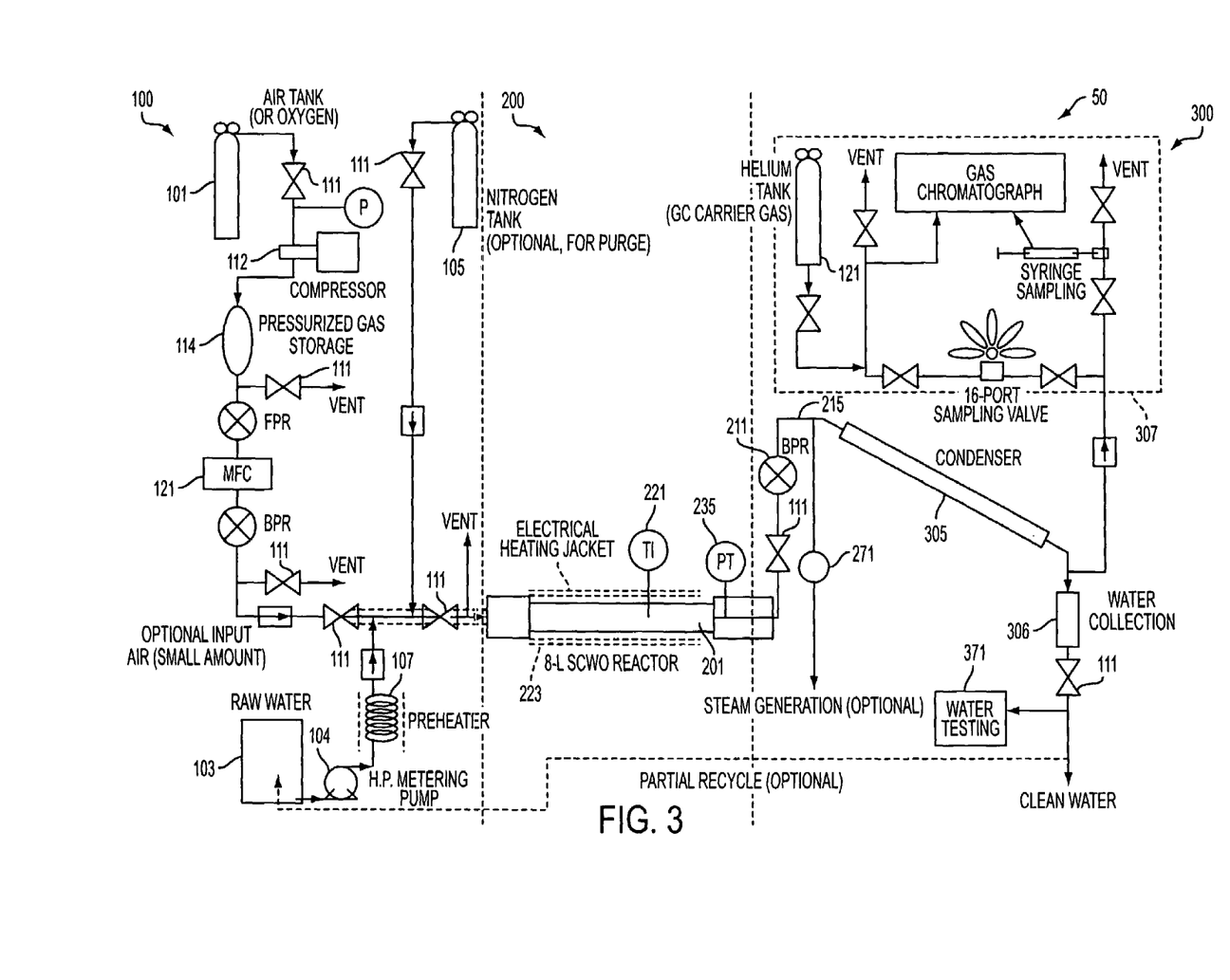
FIG. 3 Provides an embodiment of an SCWO water purification and desalination system.

FIG. 3 provides an embodiment of a block diagram showing the layout of a supercritical water oxidation (SCWO) water purifier (50) which can be used to purify raw water into potable output water by using SCWO processes. In FIG. 3 there are generally three broad component stages which relate to the operation of the SCWO water purifier (50).

In the stage one components (100) raw water is input into the system. An oxidant such as air or oxygen is also added into the system. Other gases may also be added to purge the system as needed. In the stage two components (200), a supercritical water reactor (SCWR) (201) takes in the pressurized and heated raw water and air mixture and converts the raw water and contaminants into purified output water. In the stage three components (300), the output water is condensed and collected and other output products are discarded.

In the stage one components (100) there are three chemical feeds: air or oxygen feed (101), input water feed (103) and nitrogen feed (105). The air feed (101) is generally arranged so as to allow air or oxygen to be obtained from a pressurized air tank or from simply pumping in atmospheric air and having a compressor (112) compress the air to place it under pressure. It may then be stored in gas storage (114). In a preferred embodiment, the percentage of air in the resultant raw water/air mixture will be of significantly smaller amounts than the amount of raw water used. The amount of air fed generally will depend on the organic content of the water, and, in an embodiment, is determined during operation by the gas analysis taking place near the end of the process stream in sensor system (307). Mass flow controller (121) controls the amount of air mass flowing in air feed (101). The air fed by air feed (101) will generally comprise a mixture of nitrogen, oxygen and various other gases. Generally the nitrogen will comprise about 78% of the mixture, oxygen about 21% of the mixture and the other gases comprising 1%. For the purpose of this disclosure, the exact composition of the other gases will be ignored as their effect is relatively minimal on the resulting reaction and they will generally be vented later in the process. In an alternative embodiment, the air feed (101) may actually feed pure oxygen into the system as the air feed (101) is principally used to feed an oxidizer into the system. The nitrogen is generally present but not utilized in regular operation and is instead used for purge as discussed later.

The input water feed (103) includes a liquid pump (104) designed to feed the raw water into the system using any type of liquid feed technology known now or later developed. The pump (104) preferably pressurizes the water to a pressure level near the critical pressure of water (218 atm) as shown in FIG. 1. Before the input water is provided to the SCWR (201), it will generally pass through a preheater (107) which heats the water to a point near the critical temperature (374° C.) as shown in FIG. 1. The air and raw water may be mixed prior to entering SCWR (201) as in the depicted embodiment forming a raw water/air mixture but may be mixed in the SCWR (201) in an alternative embodiment. Generally, there will be valves (111) at various points between the air feed (101) water feed (103), and the SCWR (201) (and at other points in the SCWO water purifier (50)) to prevent back feed, to regulate the amount of each material provided in the mixture, and to maintain the pressure inside the SCWR (201).

The first stage components (100) may also include a purging system as shown. The purge system will generally comprise a nitrogen or other inert gas feed (105) which may be provided into the system under pressure. This purge can be used to clean the system of residual materials during system shutdown.

As the input mixture of raw water and air enters the second stage components (200) it enters into the SCWR (201). The SCWR (201) is typically a vessel constructed according to known high pressure design codes of Hastelloy—C276, Inconel, or other suitable material. In an alternative embodiment, the reactor may be constructed of stainless steel. The SCWR (201) may be either a mixed-type or continuous tubular type. As depicted in FIG. 3, the SCWR (201) may be equipped with heating elements (223). Depending on the organic content of the raw water feed, the energy requirements of the SCWR (201) may be, in an embodiment, self-sustaining eliminating the need for heating elements (223). Alternatively, heat exchange components may be included in the system as discussed later.

In the SCWR (201), the supercritical water drives an oxidation reaction to break down the organic contaminants suspended therein into additional water or other inert ingredients. In particular, supercritical water completely dissolves all organic materials likely to be present in the raw water. All these ingredients further will react generally completely with oxygen in a homogeneous reaction phase within the SCWR (201) resulting in water, carbon dioxide and nitrogen as outputs. Equation 1 provides for a collection of chemical formulas showing the breakdown of some of the materials which can be present in raw water while in the SCWR (201):

$$HOOC-R-NH_2 + O_2 \rightarrow CO_2 + H_2O + N_2 \quad \text{Equation 1}$$

$$H_2N-CO-NH_2 + \frac{3}{2}O_2 \rightarrow CO_2 + 2H_2O + N_2$$

$$2NH_3 + \frac{3}{2}O_2 \rightarrow N_2 + 3H_2O$$

$$C_xH_yO_z + nO_2 \rightarrow xCO_2 + \left(\frac{y}{2}\right)H_2O$$

Unlike many other types of reactions performed using supercritical oxidation, this reaction preferably uses the water portion of the raw water as the source for supercritical water to break down the materials in solution with the raw water. There is generally no need to provide additional water to allow the reaction. Unlike many other treatment processes, the process also converts nitrogen containing organic species into water, nitrogen, and carbon dioxide as shown in Equation 1 which are all relatively harmless. Inorganic compounds, which are generally insoluble in the supercritical water can be precipitated out as ash or salt.

In the depicted embodiment, the SCWR (201) is monitored by a temperature controller (221) which senses the internal temperature of the SCWR (201) and as necessary applies additional heat input to the SCWR (201) using heating elements (223) to maintain the temperature in the SCWR (201) near the critical temperature of water. The pressure inside the SCWR (201) is preferably monitored by pressure transducer (235), and, as necessary the pressure of water feed (103) is adjusted to maintain the pressure in the SCWR (201) near the critical pressure of water. A pressure relief valve may also be present in case the pressure inside the SCWR (201) reaches dangerous levels, if such high levels are detected, pressure will generally be released from SCWR (201) via a vent to prevent danger.

Once the SCWR (201) has purified the raw water into output water and relatively harmless components such as by the equations of Equation 1, the effluent stream (215) is passed through a pressure regulating valve (211) and into stage 3 (300) components. Valve (211) also serves to help maintain the pressure inside SCWR (201).

The stage three components (300) are principally related to capturing the output water in the effluent stream (215) in a useful form. As the effluent stream (215) of materials will still be in a high energy state, water steam may be drawn off via a steam output (271) if necessary. The steam can then be used to provide steam heat, steam power, or to otherwise be used as is known to those of ordinary skill in the art.

The temperature in the stage 3 components (300) will generally be lowered to allow precipitation of the output water out of its supercritical fluid state. This precipitation may be performed by a condenser (305). The resultant liquid water is collected by water collector (306) while the carbon dioxide and nitrogen gas (and other materials, if present) may be removed using any manner known to those of ordinary skill in the art, or simply vented. The output water will generally be tested for cleanliness by water tester (371) and be either piped to where it is to be used or placed into storage vessels as is understood by those of ordinary skill in the art.

Control of the SCWO water purifier (50) is performed in the embodiment of FIG. 3 by monitoring the SCWR (201) effluent stream (215). A sensor system (307) containing a gas chromatograph or other suitable sensor determines the composition in effluent stream (215). From these results, a user can adjust the air feed (101) and water feed (103) to control the residence time of the supercritical water/air mixture in the SCWR (201). The sensor system (307) may control air feed input into the SCWR (201) by means of mass flow controller (121) using automatic control. Alternatively, the system may be entirely regulated by a user.

Alternative embodiments of SCWO water purifier (50) may include energy recovery means such as heat exchangers to reclaim heat from the output of the SCWR (201) to use to pre-heat water feed (103), and/or pressure or work exchangers to reclaim pressure from the output of the SCWR (201) to pressurize the raw water feed (103) into the SCWR (201).

Figure 4:
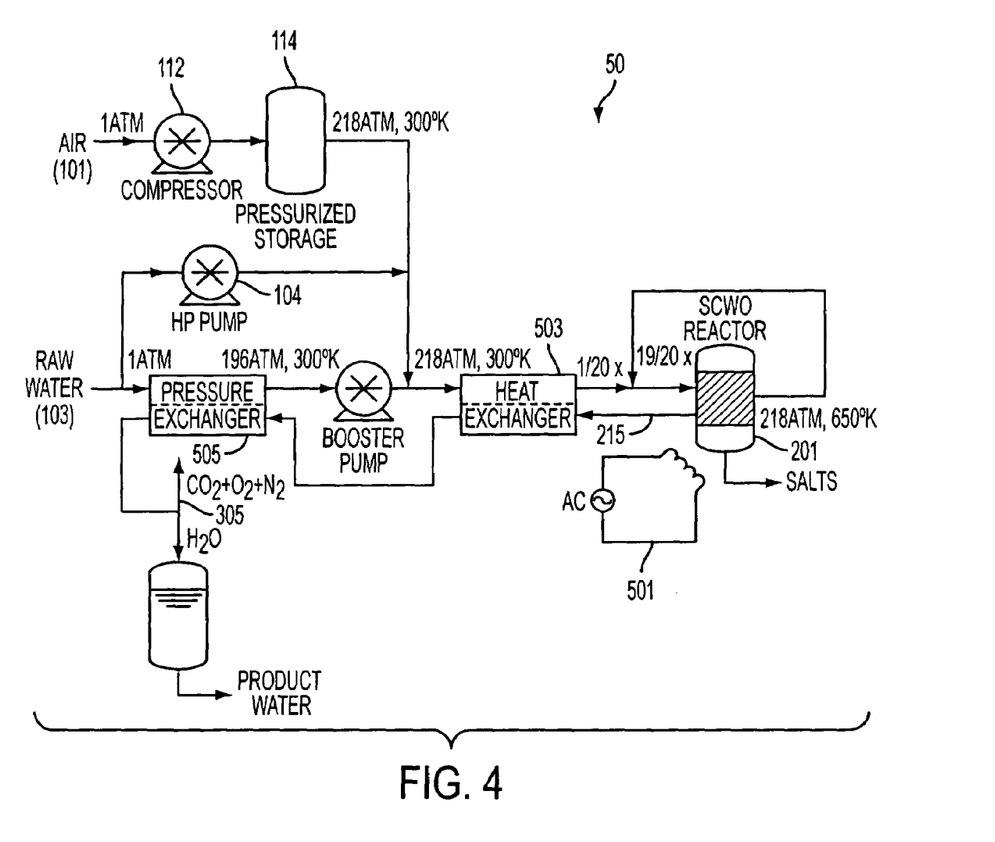
FIG. 4 Provides a view of an embodiment of a wastewater purification system utilizing thermal and work energy recovery from the process.

The embodiment of FIG. 4 provides for a similar embodiment to that of FIG. 3, however, in this system the heating system elements (223) surrounding the SCWR (201) are specifically called out to be part of an electrical system (501). Further, the raw water is passed through a pressure and heat exchanger (505) and (503) respectively. The effluent stream (215) is also passed through the heat exchanger (503) and pressure exchange (505) on its way out from the SCWR (201). These exchangers (503) and (505) may utilize any methods or means known to those of ordinary skill in the art to exchange heat and pressure from the resultant stream (215) to the raw water/air mixture to help raise its pressure and temperature levels. In this way, the heat and pressure of the resultant stream (215) is recycled back into the raw water which helps to make the system run more efficiently and requiring less heat from the heating elements (223) or preheater (107).

Figure 5:
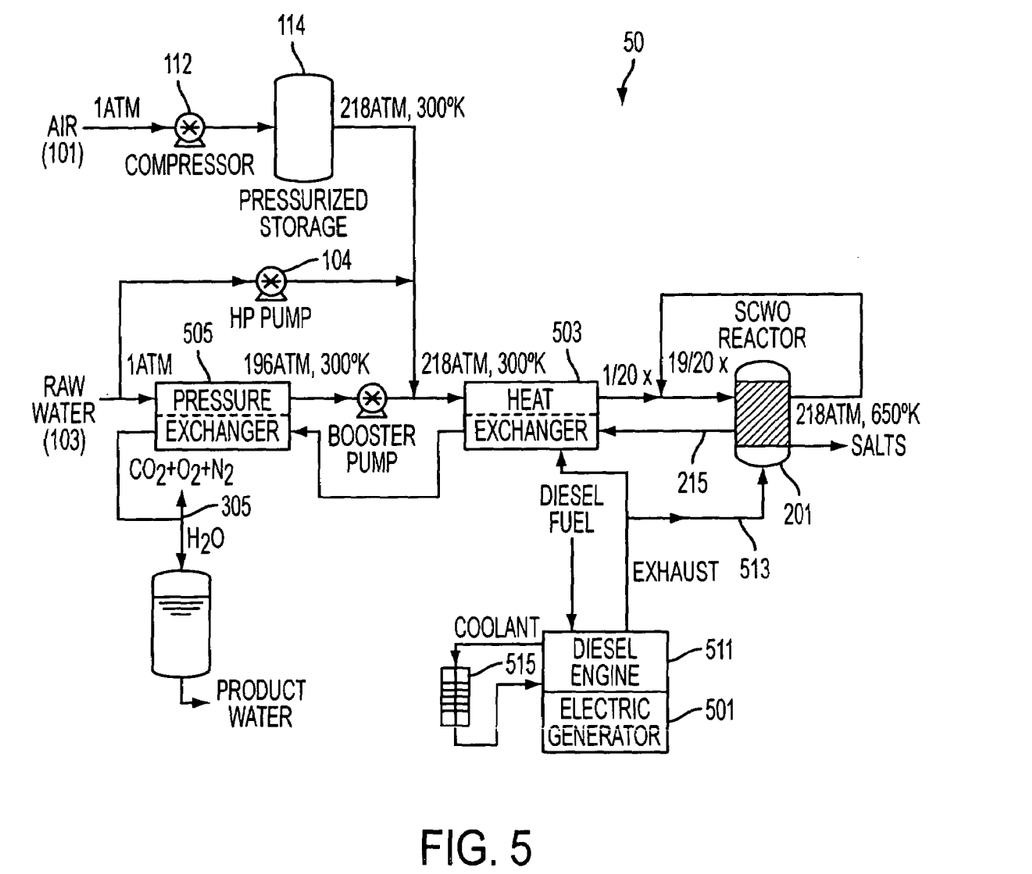
FIG. 5 Provides a view of a second embodiment of a water purification or desalination system utilizing thermal and work energy recovery from the process and from the exhaust of a diesel powered heating or electric generator system.

The embodiment of FIG. 5 takes the heat recycling program one step further. In this embodiment, heat is provided by a diesel engine (511) combined with an electrical generator (501). This is the type of power system one would expect to be in use with an SCWO water purifier (50) in use in a remote location (such as an army base camp) or for use in an emergency or temporary settlement where power infrastructure either does not exist or has broken down. It is well known to those of ordinary skill in the art that much of a diesel engine's energy consumption is rejected to the environment or lost to heat in the exhaust. In this embodiment, the heat of the exhaust (513) is applied to either the SCWR (201) or to the raw water/air mixture. This system is preferably used in conjunction with a heat exchanger (503) and pressure exchanger (505) as shown in FIG. 4 to further improve the efficiency of the system. As the diesel engine is likely to require engine coolant (515). The coolant for the engine may be harnessed using a heat exchanger to provide heat to the raw water/air mixture. This can further improve efficiency.

The embodiments of FIGS. 3–5 do not require a particularly large setup, or particularly complicated operation. It should be apparent that the SCWO water purifier (50) could be assembled to be readily vehicle portable to a variety of locations. In particular, the SCWO water purifier (50) would preferably be able to fit on a pallet such as a forklift pallet or a 463L pallet as used by the United States Air Force. Alternatively, a scaled up version of the SCWO water purifier (50) could be placed in an over-the-road (OTR) truck trailer or on a pallet, crop, or flatrack utilized by Load Handling System (LHS) trucks such as the HEMTT-LHS truck used by the United States Army.

SCWO water purifiers (50) can be used in a wide variety of applications. Generally, these applications will revolve around the creation of potable water for cooking, cleaning, or drinking by human beings, however the SCWO water purifier may be used anywhere water purification is desired.

This can include but is not limited to, purifying water to a potable state for any use, and purifying of wastewater for safe discharge into the environment even if potable water is not produced.

Figure 6A:
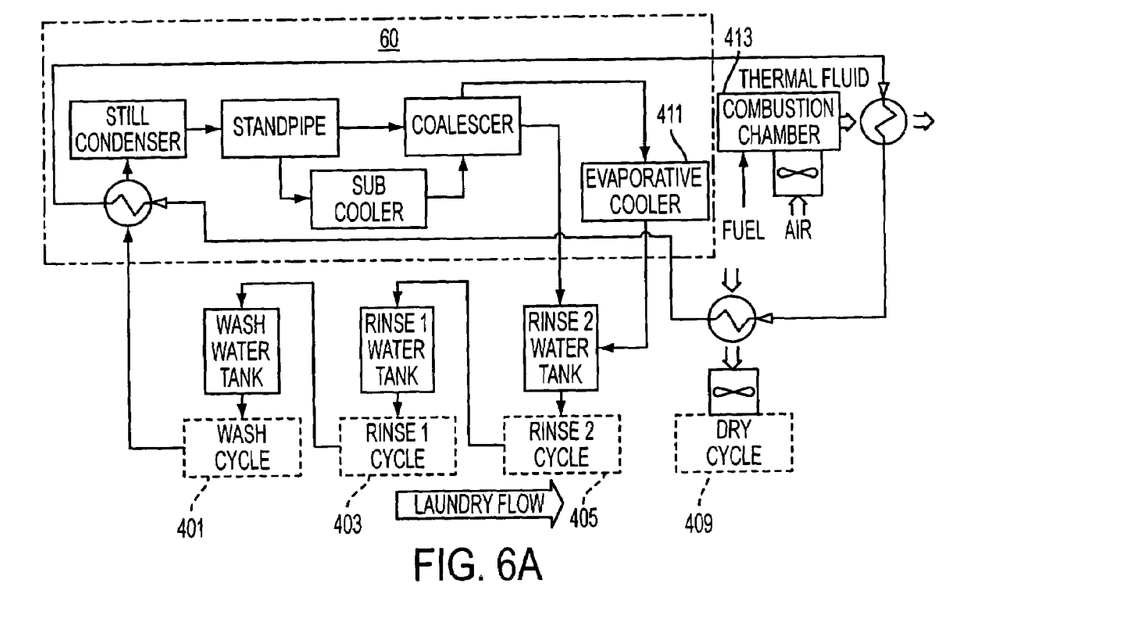
Figure 6B:
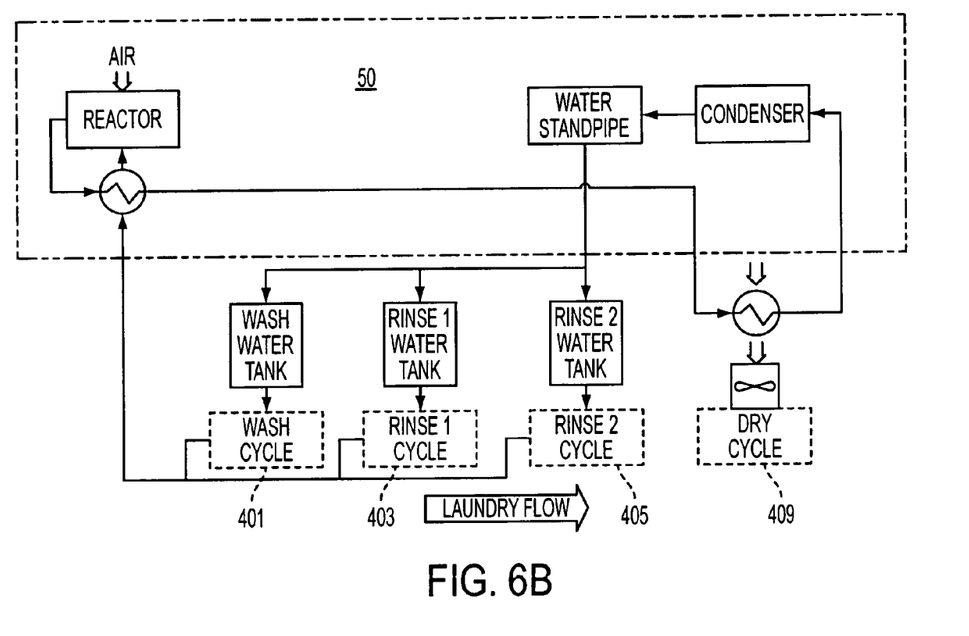

On-board ships, various supplies of water can be purified as necessary to provide potable water. Ships may carry water in their bilges, in their fuel tanks, as ballast, or in other supplies to service needs of both the ship and the crew. Water in these areas may be purified using and SCWO water purifier (50) for use by the crew in cooking, cleaning, showering or latrine services, or for drinking FIGS. 6A and 6B show how an embodiment of the SCWO water purifier can be utilized in a particular water process stream to simplify and render more efficient a water use process. In particular, FIG. 6A provides for a Laundry Advanced System (LADS) as currently used by the United States Army. As can be seen in FIG. 6A, water reclamation is performed through a distillation system (60). Water loss in the system occurs from evaporation during the drying cycle (409) and the evaporative cooler (411). There are generally two washing/drying machines per unit which perform a wash cycle (401), 1st and 2nd rinse cycles (403) and (405) and dry cycle (409). Each load of clothes takes about 65 minutes to launder. There is also a generator (413) for heat in the dry cycle (409).

In FIG. 6A if no water reuse was performed in the multiple cycles and no reclamation was performed, the LDS would consume 26,600 liters of water per day of operation under normal circumstances. Simply reusing water in the wash (401) and two rinse cycles (403) and (405) this drops to 9,840 liters per day. The inclusion of the distillation system drops this use to 1,890 Liters per day but at the additional cost of generating 151 Liters per day of waste water sludge which must be disposed of and uses 270 lbs per day of fuel.

In FIG. 6B the distillation system is replaced by an SCWO water purifier (50). In this system, heat from the SCWR (201) outflow can be harnessed to provide heat to the drying cycle. Further, heat and pressure exchange systems such as those in FIGS. 4 and 5 can be included to improve efficiency of the system in retaining heat. This allows for elimination of the combustion chamber to provide heat for the drying cycle which can dramatically decrease fuel use. Further, because the SCWO process breaks down organic contaminants into additional clean water, the amount of sludge which must be disposed of is dramatically decreased, and under certain circumstances, may even be eliminated. Still further, as the output of the SCWR is hot water which can be immediately used for laundering, still further efficiencies can be obtained from not having to heat the water.

While FIG. 6 provides for an embodiment of how an embodiment of an SCWO water purifier may be used in a laundry setting it is not the only place where the technology is beneficial. SCWO water purifiers (50) are also beneficial to other systems which utilize water.

In another embodiment an SCWO water purifier (50) can be used in kitchen systems. One such operation of a kitchen system is provided in FIG. 7. Kitchen waste water is generally distinguished by the presence of oil, grease, and detergent. Oil and grease entering the kitchen drainage waste system tends to solidify somewhere downstream and can eventually clog the sewer line or cause potential problems for the onsite or public sewage system. For this reason, a grease trap is generally included in the drainage system. The grease trap is generally designed to allow wastewater to flow through while trapping any free or mechanically emulsified oil, and letting it float to the top where it can be mechanically removed and disposed of as solid waste. Dishwashing flows are also rich in detergent, and emulsify a high percentage of the separated fats held in a grease trap or other type of separator. In addition to oil, grease and detergent, kitchen effluent contains food matter. For this reason the total suspended solids tends to be high which can result in both necessary solid waste disposal, and clogging of existing purification systems.

The presence of organic material in the effluent make kitchen systems ideal candidates for SCWO water purifiers (50). Because of the SCWO reaction breaking down organic matter into relatively harmless gases and water (see e.g. Equation 1), it is possible to process the effluent without need for a grease trap as organic matter therein could be completely oxidized in the SCWR (201) leaving only clean, potable water and relatively harmless gases. This eliminates the need for the grease trap, as well as the daily cleanup task, and the disposal of the solid waste resulting in a much more efficient process.

Figure 7:
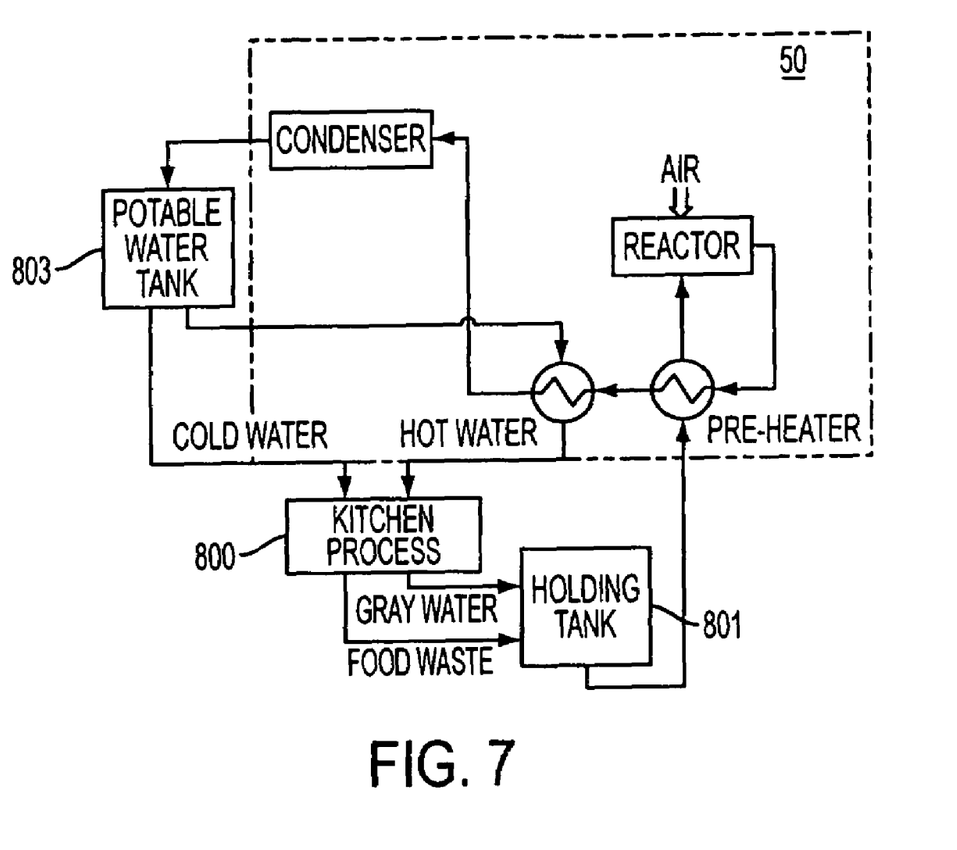
FIG. 7 Provides for a process flow of water in a kitchen system utilizing an embodiment of an SCWO purification system.

In the embodiment of FIG. 7 the kitchen operation (800) is connected to the SCWO water purifier (50). There are also included two tanks, a holding tank (801) for mixing grey water and food waste together prior to providing the mixture to the SCWO water purifier (50) as the raw water. The tank (803) may be used to store water prior to its need in the kitchen operation (800). In the depicted embodiment, the hot water input to the kitchen operation (800) utilizes work and heat exchangers of the SCWO water purifier (50) to help heat the potable water for kitchen use which can further improve efficiency.

Similar to kitchen systems, the SCWO water purifier can be used in industrial food service or manufacturing wastewater disposal. Numerous industries generate wastewater streams including organic matter particularly in the production of foods. These include, but are not limited to, beverage manufacturers, as well as plant and animal processing plants. These wastewater sources are often difficult to handle as the food processing waste can include dangerous microorganisms or spur undesirable organism growth. An SCWO water purifier (50) can be used in these situations in much the same as in the kitchen system allowing suspended food particles or dissolved items such as sugars to be broken down into purified water and relatively harmless gases.

An SCWO water purifier (50) may also be used to purify wastewater from items such as portable or field shower systems. Shower systems are slightly unique because they utilize input hot water. Several benefits are immediately apparent from the use of SCWO water purifiers (50) to shower systems. Because the SCWR (201) effluent is hot water, the need for a water heater is considerably reduced if not eliminated. This can result in reduced fuel savings. Further, the SCWO water purifier (50) recycles such a high percentage of wastewater that there is effectively no wastewater requiring disposal One of the most interesting applications of the SCWO water purifier (50) is to sewage or latrine systems where the purification or disposal of wastewater is particularly important to prevent the spread of disease. The main ingredients in latrine wastewater include ammonia, urea, organic acids, amino acids, proteins, sugars, and carbohydrates. All of these ingredients are biological matter and will generally react completely with oxygen in a totally homogeneous phase, resulting in only water, carbon dioxide, and nitrogen as previously illustrated by Equation 1.

The sewage itself serves as the source for supercritical water to power the reaction further not necessarily requiring additional input water. The most obvious benefit from the application of an SCWO water purifier (50) to latrine or sewage systems is that there is no black water or solid waste left for disposal after recycling which can greatly decrease the possibility of contagious disease and other situations which can result from inadequate septic systems and eliminates the need for logistics related to the disposal.

The above described embodiments have discussed how the SCWO water purifier (50) system can be used to treat wastewater generated by a human population to create potable water, even in self contained environments. The treated water may then be used to provide for the potable water of the same human population. However, in other embodiments there may be a need for simply purifying existing water sources and treatment of wastewater may not be necessary. Further, even in the above recycling of water, it is unlikely (but possible) that the system will timely reach 100% efficient as water will be lost to evaporation during use. Therefore, it is desirable to use an SCWO water purifier (50) to both purify and recycle wastewater and provide additional purified water from earth-based sources simultaneously, or to be used simply to purify environmental water leaving wastewater treatment to other systems.

SCWO technology is well suited to the direct generation of potable water from all types of environmental water including fresh water, brackish water, or sea water. The process treatment is decisive, and its effectiveness is generally similar regardless of the input water composition and the types of contaminants present. Because the oxidation reaction goes to completion, the process is ideally suited as a detoxification and decontamination process. The destruction efficiency in an embodiment can reach to 99.9999%. Further, the process is "green" since it only uses naturally occurring, environmentally friendly species such as water and air. Further, no hazardous byproducts are involved in the process or created by the process. Still further, pre-sorting or pretreatment of the input water is not necessary due to the virtually complete breakdown of contaminants.

In a still further embodiment, the SCWO water purifier (50) may even be used to purify wastewater generated by other purification systems to improve efficiency or speed of purification. This is also a particularly useful source for transitioning between existing purification systems and SCWO systems.

While the invention has been disclosed in connection with certain preferred embodiments, this should not be taken as a limitation to all of the provided details. Modifications and variations of the described embodiments may be made without departing from the spirit and scope of the invention, and other embodiments should be understood to be encompassed in the present disclosure as would be understood by those of ordinary skill in the art.

The invention claimed is:

1. A method for generating potable water through a recycling process, said potable water for use in a temporary settlement, said method comprising the steps of:
providing to said settlement a vehicle portable supercritical water reactor (SCWR) on a pallet or in another manner suitable for transport;
collecting raw water from a water use process within said settlement;
processing said raw water through said SCWR to generate potable water from said raw water, said processing comprising:
mixing said raw water with oxygen;
placing said raw water in a supercritical state; and
oxidizing organic contaminants in said raw water; and
directing said potable water directly to a water distribution or storage system used as a supply for water use processes in said settlement.

2. The method of claim 1 wherein said raw water is gray water or black water.

3. The method of claim 1 further comprising the step of adding water from an earth-based source simultaneously with said raw water.

4. The method of claim 1 wherein excess heat generated by said SCWR is used to increase the efficiency of said water use process.

5. The method of claim 4 wherein said water use process is laundering, and wherein said excess heat is used to dry articles cleaned in said laundering process.

6. The method of claim 4 wherein said process for which said excess heat is used to increase efficiency is dish washing, laundering, or showering.

7. The method of claim 1 further comprising the step of adding food waste to said raw water.

8. The method of claim 1 wherein said steps of collecting, processing, and directing are performed within a water process stream into which water is added to make up for water lost to the external environment during use or processing.

9. The method of claim 1 wherein said steps of collecting, processing, and directing are performed within a self-contained system that does not rely on an influx or outflow of water.

10. A method for conserving a limited supply of water through the reclamation and reuse thereof, said method comprising:
providing a truck-portable supercritical water reactor (SCWR);
to a ground-based temporary residence;
connecting said SCWR to a water process stream leep-comprising:
at least one water use process; and
an effluent drainage system for said water use process;
processing effluent from said at least one water use process through said SCWR to generate potable water therefrom, said processing comprising:
mixing said raw water with oxygen;
placing said raw water in a supercritical state; and
oxidizing organic contaminants in said raw water; and
supplying said potable water generated by processing said effluent to one or more of said at least one water use process.

11. The method of claim 10 wherein said water process stream is a stream into which water is added to make up for water lost.

12. The method of claim 10 wherein said water process stream self-contained.

13. The method of claim 10 wherein said temporary residence is one of a refugee camp or a military base camp.

14. The method of claim 10 wherein said effluent is gray water or black water.

15. The method of claim 10 wherein excess heat generated by said SCWR is used to increase the efficiency of said at least one water use process.

16. The method of claim 15 wherein said at least one water use process is laundering, and wherein said excess heat is used to dry articles cleaned in said laundering process.

17. The method of claim 15 wherein said at least one water use process is dish washing, laundering, or showering.

18. The method of claim 10 further comprising the step of adding food waste to said effluent.

* * * * *